March 6, 1951 | F. FRANZ | 2,544,495

STYLUS CONSTRUCTION

Original Filed March 19, 1945 | 2 Sheets-Sheet 1

INVENTOR
Frederick Franz
BY
Blair, Curtis + Hayward
ATTORNEYS

March 6, 1951 F. FRANZ 2,544,495

STYLUS CONSTRUCTION

Original Filed March 19, 1945 2 Sheets-Sheet 2

INVENTOR
Frederick Franz
BY
Blair, Curtis + Hayward
ATTORNEYS

Patented Mar. 6, 1951

2,544,495

UNITED STATES PATENT OFFICE 2,544,495

STYLUS CONSTRUCTION

Frederick Franz, West Haven, Conn., assignor to Dictaphone Corporation, New York, N. Y., a corporation of New York Original application March 19, 1945, Serial No. 583,559. Divided and this application October 10, 1945, Serial No. 621,425

6 Claims. (Cl. 274—38)

This invention relates to styli for recording and/or reproducing sound vibrations, and for translating vibrations in general between a translating head a record medium, and is a division of my application Serial No. 583,559, filed March 19, 1945, now Patent No. 2,464,032, patented March 8, 1949. More specifically it pertains to a type of stylus for recording and/or reproducing with an embossed sound track as distinguished from that type of sound track which is produced by the removal of a chip. It also relates to methods of forming such styli. And it is an object of the invention to provide styli of the character described which have greater mechanical strength and better frequency response than known styli, and to provide methods of making such styli. Other objects will be in part pointed out as the description proceeds and will in part become apparent therefrom.

By way of explaining the present invention it will be described as embodied in an embossing stylus for use in recording upon a plastic sheet. The invention accordingly consists in the features of construction, combinations of elements, methods of operations and arrangements of parts as will be exemplified in the structure to be hereinafter described and the scope of the application of which will be set forth in the accompanying claims. The following description will refer to the accompanying drawings illustrating this embodiment in which:

Figure 1:
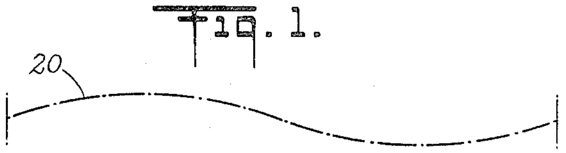
Figure 1 is a diagram illustrating on an enlarged scale a portion of a sound wave.
Figure 2:
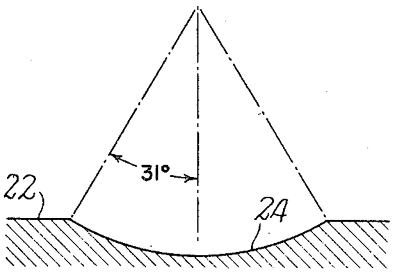
Figure 2 is a cross-sectional elevational view on an enlarged scale taken through a recording medium which has been embossed with a sound wave.
Figure 3:
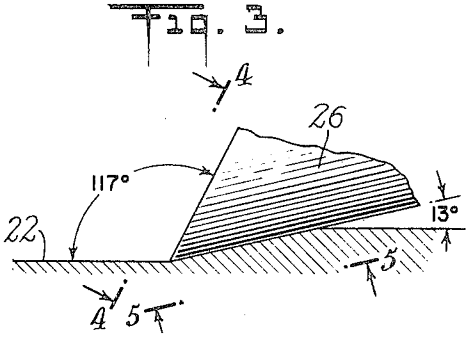
Figure 3 is a fragmentary side elevational view on an enlarged scale, partly in section, showing the point of a previously known embossing stylus in operative relationship with a record medium.

Sound recordings may be made upon comparatively soft plastics such as wax, or upon harder materials such as aluminum, or upon a number of the thermo-plastic compounds—particularly ethyl cellulose, cellulose acetate, cellulose nitrate and several of the vinyl compounds.

When recording on these materials, two different systems have been used. One, used particularly with the softer plastics, consists in the actual cutting of a groove out of the material. This requires a cutting stylus made from very hard steel or preferably sapphire or diamond. The tip of such a stylus is usually made in a V-shape with a flat front face practically perpendicular to the material which is being engraved. The point of the V is not sharp but is rounded off at a small radius of from 0.001 in. to 0.003 in. The standard for disc recording is 0.0022 in. The cutting of these harder materials requires a sharp stylus. In order to maintain the requisite sharpness, it is necessary to regrind or replace the stylus at frequent intervals.

The other system of recording is the embossing method. It does not require frequent stylus replacement and does not involve throwing off a chip which would have to be eliminated in some manner. When embossing, the recording stylus causes the material to flow to each side of the stylus. The record material has to be soft enough for this flowing to occur smoothly and uniformly and the stylus has to be so shaped that the flowing occurs in such a manner that the smoothest possible groove is produced; and it must give a recording of satisfactory frequency response.

Among the earlier embossing styli constructions was one made by axially rotating an engraving type stylus through 180° with respect to the translating head and then tipping it at a slight angle from the perpendicular and toward the approaching recording medium, thus producing a V-groove in the record surface. This stylus gave excellent frequency response characteristics but the comparatively sharp point was very easily broken, particularly if the recording medium for any reason was reversed in its direction of travel. In the event of such reversal, the point tended to dig into the record material, piercing it and striking a metal backing which in turn caused the point to be chipped.

Some of this difficulty was overcome by using a conical stylus with a spherical end having a radius of 0.001 to 0.002 in. This had somewhat greater strength but its use required displacement of a greater amount of recording medium. The frequency response in this case was largely determined by the tip radius and this could not be made small enough to give the best high frequency response without again reducing its mechanical strength. Various combinations of flattened and/or rounded stylus surfaces were tried at one time or another, but unsuccessfully, because no stylus having good recording qualities over a wide frequency range was of sufficient mechanical strength to render satisfactory commercial service.

Because of these physical difficulties many theoretical studies have been made of this problem to determine just how a better stylus could be produced. I have discovered a certain relationship of shapes which result in an enormous improvement, as far as mechanical strength is concerned, and which, at the same time, give excellent recording properties over a broad frequency band and which prevent digging into the record material upon reversal of direction. Before going into the details of these relationships some general observations regarding sound recordings will first be made. Some of these observations have previously been made by others but they serve as an introduction for my own discoveries.

The track traced on a moving record by a stylus which is vibrated by sound may be described as having two components—first, a longitudinal, and second, a lateral, component. The longitudinal component is generally described as the wave length, and the lateral component as the amplitude, of the vibration. Both of these elements are indicated by line 20 in Figure 1. Here, a 200 cycle per second sound wave having a 0.002 in. double amplitude has been drawn to a scale of 200 to 1 as it would appear on a record surface moving with respect to the stylus at a rate of 22 feet per minute. This wave length, however, is represented by only the center line 20 of the groove which would be produced in the record by the stylus. (Note: I use throughout a record surface velocity of 22 feet per minute because it is one of the standard speeds of such machines as are illustrated in Yerkovich Patent No. 2,318,828, issued May 11, 1943.)

Figure 6:
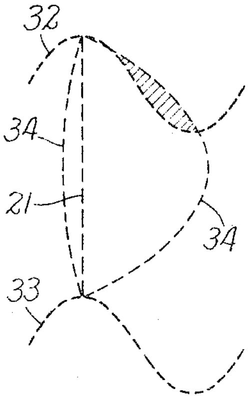
Figure 6 is a diagrammatic plan view on an enlarged scale showing some of the relationships between the tip of a recording stylus and a sound wave being recorded upon a record medium.
Figure 8:
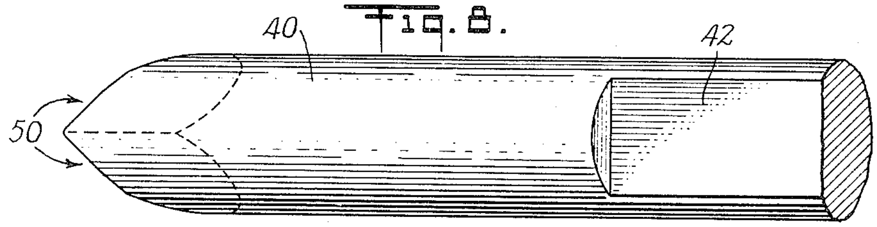
Figure 8 is an elevational view of the stylus of Figure 7 looking in the direction of the arrows 8—8.

In Figure 6 may be seen both the shape of the wave form and also the width of the track for a 2500 cycle wave having an amplitude of 0.00075 in. similarly recorded and drawn on a scale of 1000 to 1. Assuming that the width of the tracing part of the stylus were a straight line 0.0021 in. in length, as indicated in Figure 6 at 21, the two enveloping curves of the track would be produced, and would be disposed symmetrically in regard to the center line of the path. The curves (outside envelopes and central path) would be identical since longitudinal and lateral motions are identical.

If, however, the tracing end of the stylus, instead of having only one dimension, that is length up and down on the sheet, also has lateral dimensions, the envelope shown would no longer be traced with fidelity. In Figure 6 this lack of tracing fidelity is shown for a stylus having a tracing point of approximately the triangular cross-sectional shape outlined by the dotted curved lines 34. It will be noted that as this point proceeds along its path (Figure 6) a cross-hatched area is wiped out before the widest portions of the stylus reach this area, so that when the upper corner of the stylus traces its true curve in the cross-hatched area the record of the truly traced curve is not impressed on the record material. The amount of obliteration of the yet ungenerated sound track depends upon the dimensions and shape of the stylus and upon the direction of motion of the stylus upon the record material. If the tracing point of the stylus approximates a straight line, as shown at 21, the track left on the record will be more nearly in conformity with the original motion of the recorder than if the stylus dimensions are as shown by the curved lines 34 of Figure 6.

Figure 4:
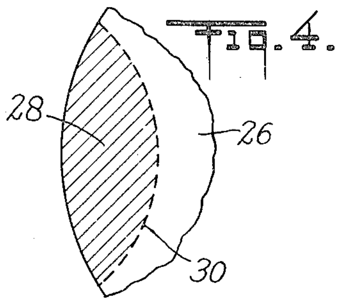
Figure 4 is an angular view of the stylus point taken along the line 4—4 of Figure 3.
Figure 5:
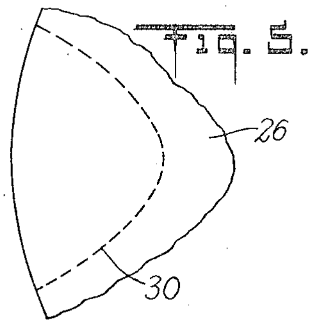
Figure 5 is an angular view of the stylus point taken along the line 5—5 of Figure 3.

In Figures 2–5 the exact shape of the end of one of the commonest embossing styli, in contact with and pressing upon the record material, is shown. This type of stylus is sometimes called a "spade" stylus and in Figure 3 it is drawn to scale and shown enlarged 1,000 times. Here a recording medium 22 appears bearing a sound groove 24 made by a stylus point 26. In Figure 4 a cross-hatched area 28 appears. This is the area of the record surface which is in contact with point 26 at any given time and it is bounded on its approach side by a line 30.

In order to obtain an undistorted simple harmonic curve when this shape is used as a generating point, it is necessary to limit the maximum slope of the recorded sound tract (and hence the maximum recorded frequency) to 24°. This is because the angle of the slope of line 30 (see Figure 5) is 24°. When the maximum curve slope is 53°, for example, as in the case when a 2500 cycle wave of 0.00075 in. amplitude is recorded (illustrated in Figure 6), this wave will be partly obliterated by the generating point (see cross-hatched area of Figure 6) before the generating portions of the stylus will have recorded the curve.

It will be noted (Figure 3) that the leading face of this stylus makes an angle of 13° with the plane of the recording medium. It will also be noted that the trailing face makes an angle of 117° with the plane of the recording medium. This leaves an included angle of 50° between the faces of the stylus. This small and sharp point is weak and is a source of many breakages. A primary object of this invention was to increase the strength of this point and simultaneously to improve its recording properties. This object was achieved by structurally strengthening the point and reshaping the various surfaces so that the point would trace sound grooves in fidelity with the movement of the stylus.

In the discussion of this new stylus, it will be well first to define three angles:

1. The angle of approach—this is the angle between the leading edge of the stylus which produces the groove and the recording surface.

2. The angle of recession—this is the angle between the trailing edge of the recording stylus and the recording material.

3. The included angle of approach (or of recession)—this is a dihedral angle formed in the approach (or recession) face of the stylus. The record material is flowed to both sides of the stylus under the influence of this dihedral approach face in somewhat the same manner that water flows past both sides of the prow of a ship.

The approach angle is determined by the depth of groove required, the hardness of the material and the frequency response desired. The greater the angle, the greater the depth of the groove and the better the high frequency response—within certain limits. The harder the material, the greater this angle may be. The pressure on the stylus also has an important effect on the angle chosen because the greater the pressure, the smaller the approach angle must be to retain a suitable depth of groove.

Approach angles varying from 10° to 38° have been found workable but an angle of about 15° has been found to give the best balance of various characteristics for most recordings. This can produce recordings with not more than 6 decibels difference between 300 and 2500 cycles when used on a machine of the type described and claimed in the aforementioned Yerkovich patent. The top useful frequency response runs up to about 4500 cycles.

The recession angle has great effect on the mechanical strength of the embossing point. It has a somewhat lesser effect on the depth of the groove. The smaller this angle, the shallower is the embossing. Recession angles of from 10° to 75° have been used but one of about 60° has been found advantageous for most purposes. Unless the recession angle is equal to, or greater than, the approach angle some obliteration of the sound track may result at higher frequencies from interference by the recession face.

The included angle of approach influences the width of the groove for a given depth and also influences the depth of the groove for a given pressure. An included angle of 60° has been found satisfactory, although if very high frequency response is desired it may be well to increase the included angle of approach to something over 100° and at the same time to increase the angle of approach.

The intersection of the two planes forming the dihedral on the approach side (also on the recession side) is not sharp, but terminates in a radius. This radius ordinarily varies from about 0.0005 to 0.003 in. although the amount of the radius will depend upon the hardness of the particular material upon which the sound groove is embossed and the spacing between adjacent grooves. The recession faces come together with a somewhat greater radius, depending, however, upon the radius on the approach side, as will be described hereinafter. These radii give the stylus a rounded point, when viewed in profile along the groove being embossed, somewhat like the profile of the spade stylus point of Figures 2–5. Such a point is both mechanically stronger and produces a higher quality of recording than would result from the sharp point which would be present if the approach and recession faces were true dihedrals lacking the intermediate central radii.

The obtuse angle which occurs at the recording point between the approach and recession faces permits a reversal of the direction of the recording medium under the stylus without causing the point to dig into it. Rather, it has a tendency to raise the point out of the groove.

Tests made with points constructed according to the invention have given recordings of improved frequency response in both high and low frequencies, showing less distortion and surface noises, and having higher efficiency of reproduction. And these points have demonstrated enormously increased resistance to impact over spade or conical styli.

Figure 7:
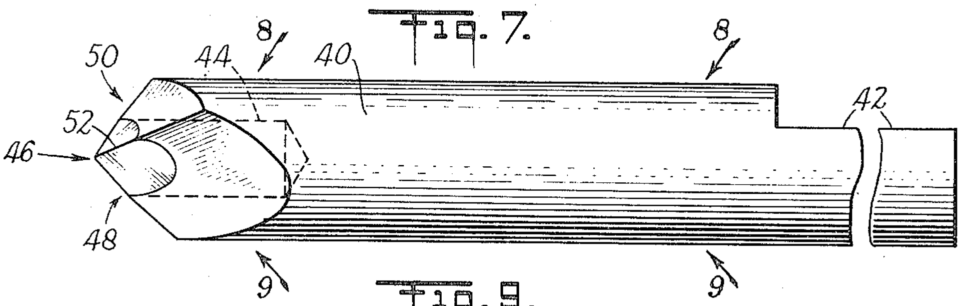
Figure 7 is a plan view on an enlarged scale of a stylus embodying the present invention and lying on one side.
Figure 9:
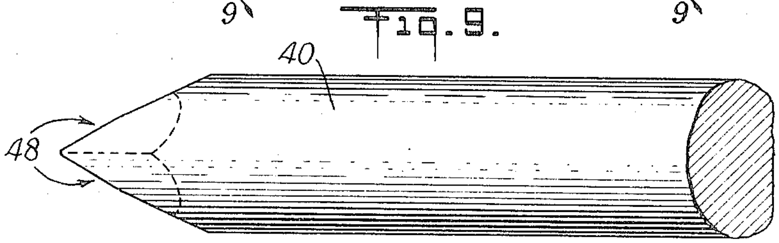
Figure 9 is an elevational view of the other side of the stylus of Figure 7 looking in the direction of the arrows 9—9.

In Figure 7 a stylus embodying the invention is generally indicated at 40 having a flat 42 for conventional use in correctly orienting the stylus shank in the recording head. Stylus 40 preferably is made of aluminum or similar material and has a shank diameter on the order of 0.062 in. At the point of the stylus a sapphire 44 on the order of 0.018–0.040 in. diameter is embedded in the stylus shank. The stylus is ground to a point indicated at 46 consisting of an approach surface 48 and a recession surface 50. These two surfaces intersect to form a tracing intersection indicated (Figure 7) at 52.

Figure 10:
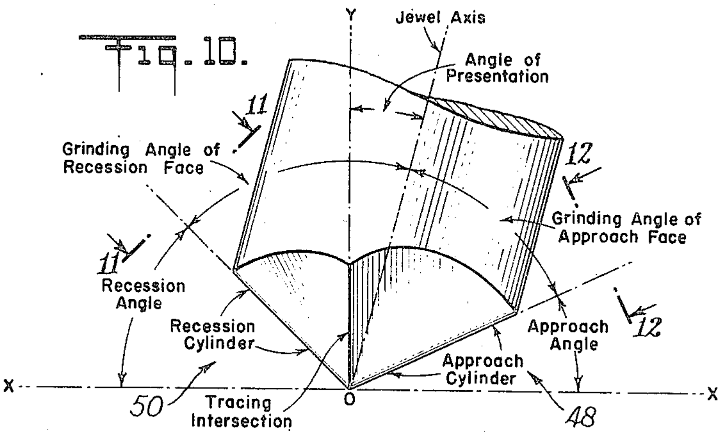
Figure 10 is an enlarged elevational view showing some of the geometrical relationships between the point of a stylus embodying the invention and a record surface.
Figure 11:
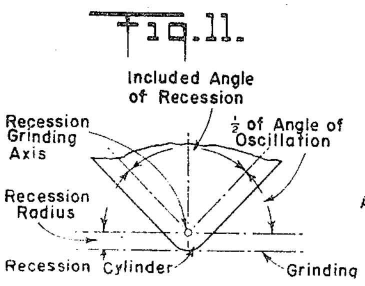
Figure 11 is a view of a portion of the stylus of Figure 10, taken along the line 11—11.
Figure 12:
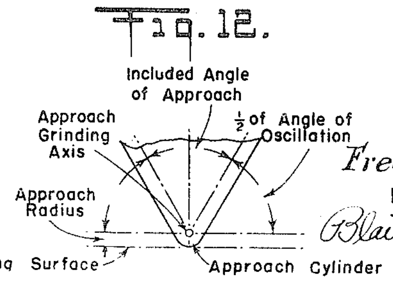
Figure 12 is a view of a portion of the stylus of Figure 10, taken along the line 12—12.

Figures 10, 11 and 12 illustrate on an enlarged scale the ground sapphire with various legends on the drawings pointing out particular portions. Figure 10 shows the jewel point superimposed upon a pair of X and Y coordinates intersecting at O and with the tip of the jewel coinciding with point O. The jewel axis is indicated as also passing through point O and the angle between the Y axis and the jewel axis is identified as the angle of presentation. With the relationship illustrated in Figure 10, relative movement of the surface of the recording medium with respect to the jewel would be to the left, along the X axis or else along a curved surface wherein tangents to the surface at the point of contact would correspond to the X axis.

As pointed out previously, the angle between the front face of the stylus point and the X axis is indicated at the approach angle. Similarly the angle between the rear face of the stylus point and the X axis is indicated as the recession angle. The approach face of the point is ground or lapped on the stylus by establishing an approach grinding axis (see Figure 12) parallel to the grinding surface and spaced therefrom by an amount greater than the approach radius. The stylus is then oscillated about this axis to grind the approach face and is fed toward the grinding surface until separated from it by an amount equal to the approach radius. Thereafter a recession grinding axis is established parallel to the grinding surface and spaced therefrom by an amount greater than the recession radius. The stylus is then oscillated through an angle to grind the recession face and simultaneously is fed toward the grinding surface until the recession radius is reached. It is not essential that the grinding axes be parallel to the grinding surface at the beginning of the grinding operations but each axis should be substantially parallel to the grinding surface as the grinding of each face is completed in order to maintain accuracy among the various ground surfaces. The angles through which the stylus must be oscillated to form these surfaces are indicated in Figures 11 and 12 as the angles of oscillation. The grinding angle of the approach face and the grinding angle of the recession face are pointed out in Figure 10. They are, respectively, the angle between the jewel axis and the approach grinding axis and between the jewel axis and the recession grinding axis.

With the process described it will be observed that the approach face is formed by a pair of plane surfaces bounded at the center by a portion of a cylinder tangentially blended therebetween and indicated as the approach-cylinder. Similarly, the recession face is made of two planes and an intermediate recession cylinder. Insofar as I know at present, either the approach face or recession face may be ground first although it is possible that the grinding or lapping process may leave a minute burr along the tracing intersection where these surfaces come together. If this is in fact so then the recession surface should be ground first and the approach surface second.

I have found it advisable to keep the intersection of the cylindrical faces at the approach and the recession edges (tracing intersection) such that it is always approximately normal to the plane of the recording medium. If approach and recession faces are otherwise symmetrical, the radii of the approach and recession cylinders should also be equal. This must be so in order to have their intersection normal to the plane of the recording medium. As the recession angle approaches the normal, the recession radius should increase and when the recession face is normal to the plane of the recording medium the recession radius becomes infinite, resulting in a flat face. If the tracing intersection is not perpendicular to the plane of the recording surface, then the upper part of the embossed groove will either be ahead of or trailing behind the corresponding portion of the bottom of the groove so that the upper and lower portions of the groove will not be in phase. A reproducing stylus having a tracing intersection arranged at the same departure from the normal would reproduce such a groove but in general it is more satisfactory to maintain the tracing intersection perpendicular.

The manner in which the various surfaces are ground will determine the location of the tracing intersection and these in turn must be established with regard to the amount of the angle of presentation. After the approach angle and recession angle have been established and the angle of presentation is known, the tracing intersection can be made to determine a plane parallel to the Y axis by geometrical selection of the radius of the recession cylinder with respect to the correct radius of the approach cylinder and by the correct selection of the included angle of approach and included angle of recession. These two last-mentioned angles, as will be apparent from Figures 11 and 12, depend upon the amount of the angles of oscillation.

I have found that excellent results ensue if the following relationships are observed:

Angle of approach 15°
Angle of recession 60°
Grinding angle of approach face 48°
Grinding angle of recession face 57°
Angle of presentation 27°
Radius of approach cylinder 0.0015 in.
Radius of recession cylinder 0.0025 in.
Included angle of approach 60°
Included angle of recession 88°

From the foregoing it will be observed that styli and methods of operations upon styli embodying my invention are well adapted to attain the ends and objects hereinbefore set forth and to being commercially exploited since all features are readily suited to conventional manufacturing expedients and lend themselves to such variations as will be necessitated in applying the invention to different applications.

As various embodiments may be made of the above invention and as changes might be made in the embodiments above set forth, it is to be understood that all matter hereinbefore set forth or shown in the accompanying drawings is to be interpreted as illustrative and not in a limiting sense.

I claim:

1. In a vibration translating system of the type wherein relative movement occurs between a recording medium and a translating stylus angularly disposed with respect thereto, the combination with said stylus of a translating point carried thereupon and during normal vibration translation constrained into a predetermined orientation in contact with the surface of the recording medium; said point including a cylindrical approach surface and a cylindrical recession surface, said cylindrical surfaces being angularly arranged with respect to one another and axially intersecting to form a tracing intersection, and the angle between the surface of the recording medium and the axis of said cylindrical approach surface being not greater than the angle between the surface of the recording medium and the axis of said cylindrical recession surface.

2. In a vibration translating system of the type wherein relative movement occurs between a recording medium and a translating stylus angularly disposed with respect thereto, the combination with said stylus of a translating point carried thereupon and during normal vibration translation constrained into a predetermined orientation in contact with the surface of the recording medium; said point including a cylindrical approach surface and a cylindrical recession surface, said cylindrical surfaces being angularly arranged with respect to one another and axially intersecting to form a tracing intersection, said tracing intersection determining a plane substantially perpendicular to the surface of the recording medium, and the angle between the surface of the recording medium and the axis of said cylindrical approach surface being not greater than the angle between the surface of the recording medium and the axis of said cylindrical recession surface.

3. In a vibration translating system of the type wherein relative movement occurs between a recording medium and a translating stylus angularly disposed with respect thereto, the combination with said stylus of a translating point carried thereupon and during normal vibration translation constrained into a predetermined orientation in contact with the surface of the recording medium; said point including a cylindrical approach surface and a cylindrical recession surface, said cylindrical surfaces being angularly arranged with respect to one another and axially intersecting to form a tracing intersection, the axes of said cylindrical surfaces determining a plane substantially perpendicular to the surface of the recording medium, said tracing intersection determining a plane substantially perpendicular to the surface of the recording medium, and the angle between the surface of the recording medium and the axis of said cylindrical approach surface being not greater than the angle between the surface of the recording medium and the axis of said cylindrical recession surface.

4. In a vibration translating system of the type wherein relative movement occurs between a recording medium and a translating stylus angularly disposed with respect thereto, the combination with said stylus of a translating point carried thereupon and during normal vibration translation constrained into a predetermined orientation in contact with the surface of the recording medium; said point including a cylindrical approach surface and a cylindrical recession surface, said cylindrical surfaces being angularly arranged with respect to one another and axially intersecting to form a tracing intersection, the axes of said cylindrical surfaces determining a plane substantially perpendicular to the surface of the recording medium, said tracing intersection determining a plane substantially perpendicular to the surface of the recording medium, said two planes being substantially perpendicular to each other, and the angle between the surface of the recording medium and the axis of said cylindrical approach surface being not greater than the angle between the surface of the recording medium and the axis of said cylindrical recession surface.

5. In a vibration translating stylus, a stylus shank, a stylus point on said shank, said point embodying the intersection of two cylindrical surfaces, and one of the cylindrical surfaces having a radius small as compared to a radius equal to one half the over-all thickness of said shank.

6. In a vibration translating stylus, a stylus shank, a stylus point on said shank, said point embodying the intersection of two axially intersecting cylindrical surfaces, and one of the cylindrical surfaces having a radius small as compared to a radius equal to one half the over-all thickness of said shank.

FREDERICK FRANZ.

REFERENCES CITED

The following references are of record in the file of this patent:

UNITED STATES PATENTS

| Number | Name | Date |
|---|---|---|
| 763,903 | Jones | June 28, 1904 |
| 1,990,843 | Schmidt | Feb. 12, 1935 |
| 2,094,201 | Bender | Sept. 28, 1937 |
| 2,187,512 | Capps | Jan. 16, 1940 |

FOREIGN PATENTS

| Number | Country | Date |
|---|---|---|
| 572,824 | Germany | Mar. 23, 1933 |

Certificate of Correction

Patent No. 2,541,495 March 6, 1951

FREDERICK FRANZ

It is hereby certified that error appears in the printed specification of the above numbered patent requiring correction as follows:

Column 1, line 4, after the word "head" insert *and*;

and that the said Letters Patent should be read as corrected above, so that the same may conform to the record of the case in the Patent Office.

Signed and sealed this 10th day of July, A. D. 1951.

[SEAL]

ERNEST F. KLINGE,
*Assistant Commissioner of Patents.*